United States Patent

Seto et al.

[11] Patent Number: 5,952,255
[45] Date of Patent: Sep. 14, 1999

[54] ULTRAVIOLET/INFRARED ABSORBENT LOW TRANSMITTANCE GLASS

[75] Inventors: Hiromitsu Seto; Yukihito Nagashima; Shigekazu Yoshii, all of Osaka, Japan

[73] Assignee: Nippon Sheet Glass Co., Ltd., Osaka, Japan

[21] Appl. No.: 08/941,366

[22] Filed: Sep. 30, 1997

[30] Foreign Application Priority Data

Nov. 13, 1996 [JP] Japan ..................................... 8-301386

[51] Int. Cl.$^6$ .................................................... C03C 3/087
[52] U.S. Cl. ............................ 501/71; 501/70; 501/904; 501/905
[58] Field of Search ................................. 501/66, 67, 68, 501/69, 70, 71, 904, 905, 64

[56] References Cited

U.S. PATENT DOCUMENTS

| | | | |
|---|---|---|---|
| 5,264,400 | 11/1993 | Nakaguchi et al. | 501/70 |
| 5,308,805 | 5/1994 | Baker et al. | 501/71 |
| 5,318,931 | 6/1994 | Nakaguchi et al. | 501/64 |
| 5,344,798 | 9/1994 | Morimoto et al. | 501/70 |
| 5,346,867 | 9/1994 | Jones et al. | 501/70 |
| 5,411,922 | 5/1995 | Jones . | |

FOREIGN PATENT DOCUMENTS

| | | |
|---|---|---|
| 0 653 388 | 5/1995 | European Pat. Off. . |
| 6-247740 | 9/1994 | Japan . |

*Primary Examiner*—Michael Marcheschi
*Attorney, Agent, or Firm*—Kanesaka & Takeuchi

[57] ABSTRACT

The ultraviolet/infrared absorbent low transmittance glass has an almost neutral greenish color, middle visible light transmittance, low total solar energy transmittance, and low ultraviolet transmittance, and is suitable for a window of a vehicle or a building and capable of preventing degradation and discoloration of interior materials and protecting privacy. The glass consists of base glass including: 65 to 80 wt. % $SiO_2$; 0 to 5 wt. % $Al_2O_3$; 0 to 10 wt. % MgO; 5 to 15 wt. % CaO wherein a total amount of MgO and CaO is between sand 15 wt. %; 10 to 20 wt. % $Na_2O$; 0 to 5 wt. % $K_2O$ wherein a total amount of $Na_2O$ and $K_2O$ is between 10 to 20 wt. %; and 0 to 5 wt. % $B_2O_3$, and colorants including: 0.7 to 0.95 wt. % total iron oxide (T-$Fe_2O_3$) expressed as $Fe_2O_3$; 1.1 to 2.3% $TiO_2$, 0 to 2.0% $CeO_2$, 0.013 to 0.025 wt. % CoO; 0 to 0.0008% Se; and 0.01 to 0.07% NiO. A visible light transmittance (YA) in a range from 25% to 45% and a total solar energy transmittance is in a range from 10% to 40% at a thickness between 3.1 and 5 mm.

7 Claims, No Drawings

ULTRAVIOLET/INFRARED ABSORBENT LOW TRANSMITTANCE GLASS

BACKGROUND OF THE INVENTION AND RELATED ART STATEMENT

The present invention relates to an ultraviolet/infrared absorbent low transmittance glass. More particularly, it relates to an ultraviolet/infrared absorbent low transmittance glass which has an almost neutral greenish color, middle level of visible light transmittance, low total solar energy transmittance, and low ultraviolet transmittance so that it is suitable for use as privacy protection in a vehicle.

Recently, a variety of glass with ultraviolet/infrared absorbability to be used as a vehicle windshield has been proposed with the view of preventing degradation of luxurious interior materials and reducing cooling load of the vehicle. In view of privacy protection, glass with relatively low visible light transmittance is preferably used for a rear window glass of a vehicle. Such kinds of glass include the followings.

A dark gray colored glass disclosed in Japanese Patent Publication JPA 8-157232 consists of soda-lime-silica glass including colorants consisting of 0.8 to 1.4 weight percent $Fe_2O_3$ (total iron), less than 0.21 weight percent FeO, 0.05 to 1.0 weight percent $TiO_2$, 0.02 to 0.05 weight percent CoO, and 0.0005 to 0.015 weight percent Se.

A neutral gray colored glass disclosed in claim 25 of U.S. Pat. No. 5,393,593 has a base glass composition comprising colorants consisting of 1.00 to 2.2 weight percent $Fe_2O_3$ (total iron), at least 0.20 weight percent FeO, 0.0005 to 0.005 weight percent Se, and 0.010 to 0.030 weight percent CoO. The glass exhibits luminous transmittance less than 35 percent and total solar infrared transmittance less than 20 percent at 3.9 mm thickness.

A gray colored soda-lime-silica glass disclosed in JPA 8-67526 comprises colarants consisting of 0.15 to 1.2 weight percent $Fe_2O_3$(total iron), less than 0.3 weight percent of FeO, 60 to 180 ppm CoO, 0 to 30 ppm Se, and 0 to 550 ppm NiO, which has luminous transmittance from 20 to 50 percent at a thickness of 3.9mm.

The dark gray colored glass disclosed in JPA 8-157232 is unpreferable because the luminous transmittance thereof is too low.

The neutral gray colored glass disclosed in U.S. Pat. No. 5,393,593 is also unpreferable because of its low luminous transmittance and the great content of CoO and Se.

The aforementioned glass with low visible light transmittance is superior in privacy protection, but they are unpreferable in that an occupant in a vehicle cabin sees outside quite unclearly through the glass and that a high mount stop lamp is seen unclearly. A glass with middle transmittance has been required for satisfying both privacy protection and traffic safety.

The aforementioned glass includes selenium in high concentration to provide optical properties, without essentially including nickel.

Selenium is necessary to be added to a glass batch in an amount ten times as much as demanded quantitiy in the batch, since nearly 90% of the selenium added is vaporized. Such large additive amount of selenium is unpreferable for preventing environmental polution because of its severe toxicity.

The above glass has many difficulties in being melted in an ordinary glass melting tank, because the glass comprises $FeO(T-Fe_2O_3)$ in a large amount so that it radiates heat rays strongly to heat a crown of the melting tank higher than its refractory temperature.

The gray glass composition disclosed in JPA 8-67526 has high ultraviolet transmittance higher than 10% as described in the example thereof, and the glass is unpreferable for protecting degradation of interior materials and for comfortable driving of a car.

OBJECT AND SUMMARY OF THE INVENTION

It is an object of the present invention to provide an ultraviolet/infra red absorbent low transmittance glass which has a an almost neutral greenish color, which has middle visible light transmittance, low ultraviolet transmittance, and low total solar energy transmittance and which is produced easily with using a normal glass melting tank.

The ultraviolet/infrared absorbent low transmittance glass of the present invention consists of a base glass, that is, the major constituents comprising:

65 to 80 wt. % $SiO_2$;

0 to 5 wt. % $Al_2O_3$;

0 to 10 wt. % MgO;

5 to 15 wt. % CaO wherein a total amount of MgO and CaO is between 5 and 15 wt. %;

10 to 18 wt. % $Na_2O$;

0 to 5 wt. % $K_2O$ wherein a total amount of $Na_2O$ and $K_2O$ is between 10 and 20 wt. %; and 0 to 5 wt. % $B_2O_3$, and a colorant including:

0.7 to 0.95 wt. % total iron oxide ($T-Fe_2O_3$) expressed as $Fe_2O_3$;

1.1 to 2.3 wt. % $TiO_2$;

0 to 2.0 wt. % $CeO_2$;

0.013 to 0.025 wt. % CoO;

0 to 0.0008% Se; and 0.01 to 0.07% NiO.

The glass of the present invention preferably exhibits ultraviolet transmittance, defined by ISO 9050, less than 10% at a thickness between 3.1 mm and 5 mm.

When it is measured by using C.I.E. standard illuminant "C" over the wavelength range 380 to 770 nanometers, the glass of the present invention preferably has optical properties with dominant wavelengths in the range of 480 to 560 and excitation purity less than 10% at a thickness between 3.1 mm and 5 mm.

PREFERRED EMBODIMENTS

The description will be made as regard to an ultraviolet/infrared absorbent low transmittance glass composition. It should be noted that components will be represented with percentage by weight.

$SiO_2$ (silica) is a principal component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high. The preferable range of $Al_2O_3$ is between 0.1% and 2%.

MgO and CaO improve the durability of the glass and adjust a devitrification temperature and viscosity of the glass during molding. More than 10% MgO raises the devitrification temperature. Less than 5% or more than 15% CaO raises the devitrification temperature of the glass. The durability of the glass is lowered when the total amount of MgO and CaO is less than 5%, while the devitrification temperature is increased when the total exceeds 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5% since the transmittance is reduced also at a visible range, so that the color of the glass is easy to tint yellow and difficulties during molding are caused due to the vaporization of $B_2O_3$ when $B_2O_3$ exceeds 5%.

Iron oxide is present in the form of $Fe_2O_3$ and the form of FeO in the glass. $Fe_2O_3$ is a component for improving the ultraviolet absorptivity and FeO is a component for improving the heat ray absorptivity.

When the amount of FeO is too little, the heat ray absorptivity becomes small. When the glass comprises too much FeO, the luminous transmittnace of the glass becomes lower than an ordinary level. In addition when the glass comprises too much FeO, there is an unpreferable possibility that the temperature around a crown of a glass melting furnace exceeds its refractory temperature due to absorption of the heat ray by the ferrous oxide. When an amount of FeO expressed as $Fe_2O_3$ is from 0.15% to 0.40%. The glass has a middle level of the luminous transmittance and is supreme in heat ray absorptivity.

When T-$Fe_2O_3$ is less than 0.7%, the glass is inferior in both of ultraviolet and infrared absorptivity. When T-$Fe_2O_3$ exceeds 0.95%, the amount of FeO tends to become high and the glass becomes hard to be melted in an ordinary glass melting furnace.

$TiO_2$ is a component for improving the ultraviolet absorptivity particularly by interaction with FeO. In case $TiO_2$ is added with NiO, the excitation purity of the glass is reduced and the color of the glass becomes neutral color such as green. When $TiO_2$ is less than 1.1%, the ultraviolet absorptivity becomes inadequate, and the glass becomes bluish unfavorably to have high exciting purity. When $TiO_2$ exceeds 2.3%, the glass becomes yellowish unpreferably.

$CeO_2$ is a component for improving the ultraviolet absorptivity and is present in the form of $Ce^{3+}$ or in the form of $Ce^{4+}$ in glass. $Ce^{3+}$ is effective in absorbing ultraviolet with less absorptivity in the visible range. When $CeO_2$ and $TiO_2$ coexist in the glass, ultraviolet is absorbed also by interaction of $Ce^{3+}$ and $Ti^{4+}$. $CeO_2$ is preferably contained in an mount of less than 2% so as to have greenish neutral color and to reduce the cost of expensive $CeO_2$.

CoO is a component for forming an almost greenish neutral color by cooperating with NiO and/or Se, and $Fe_2O_3$ as well as $TiO_2$. Less than 0.013% CoO makes the visible light transmittance too high. More than 0.025% CoO makes the color too blue tint and reduces the visible light transmittance. CoO is comprised preferably in an amount from 0.019 to 0.025%.

Se(selenium) contributes to a pink color, so that it reduces the excitation purity with the aid of a complementary color of CoO. More than 0.0008% Se reduces the visible light transmittance and is unpreferable for preventing environmental polution. It should be noted that Se may not be comprised as a colorant in the glass of the present invention.

NiO is a component for controlling the visible light transmittance and for reducing the excitation purity. NiO is preferably contained in an amount not less than 0.01%. When NiO is more than 0.07%, nickel sulfide stones or colored bubbles comprising nickel sulfide are sometimes present in the product and the visible light transmittance is reduced. The content of NiO is preferably in a range between 0.03% and 0.06%.

The nickel sulfide stones or the colored bubbles comprising nickel sulfide should be as little as possible. To prevent the formation of nickel sulfide stones, ZnO may be added in a range less than 0.5%. Expensive ZnO of more than 0.5% will push up a batch cost. ZnO is added preferably in a form of zinc sulfate($ZnSO_4$ or $ZnSO_4 \cdot 7H_2O$) or zinc nitrate($Zn(NO_3)_2 \cdot 6H_2O$). ZnO is added more preferably in an amount from 0.01 to 0.3%.

One or more than two among MnO, $V_2O_5$, $MoO_3$, CuO, $Cr_2O_3$, and $SnO_2$ may be added within a rang from 0% to 1% in total as a colorant or a reducing agent in such a range as not to lose middle transmittance and the almost neutral color near green.

EXAMPLES

Hereinafter, the mode of carrying out the present invention will be described referring to examples.

Examples 1 through 19

Glass raw material is prepared by adding at least one of a group consisting of ferric oxide, titanium oxide, cerium oxide, cobalt oxide, metallic selenium, nickel oxide, zinc sulfate, and a carbonaceous reducing agent into a standard soda-lime-silica glass batch composition, and mixing them. The batch composition consists of

| | |
|---|---|
| $SiO_2$ | 72.4%, |
| $Al_2O_3$ | 1.6%, |
| MgO | 3.6%, |
| CaO | 8.4%, |
| $Na_2O$ | 13.1%, and |
| $K_2O$ | 0.9%. |

The glass raw material thus prepared is heated and melted in an electric furnace at 1500° C. for 4 hours. The molten glass is flowed onto a stainless plate and annealed to the room temperature to obtain a 6 mm thick glass plate. The glass plate is then polished in such a manner that the thickness reduces to 4 mm to become a sample. Each sample is measured in the visible light transmittance (YA) by the C.I.E illuminant A, the total solar energy transmittance (TG), the ultraviolet transmittance by ISO 9050(TUV), the dominant wavelength (DW) by the illuminant C, and the excitation purity (Pe).

Tables 1 and 2 also show T-$Fe_2O_3$ concentration, FeO (converted to $Fe2O_3$)/T-$Fe_2O_3$ rate, CoO concentration, Se concentration, NiO concentration, $CeO_2$ concentration, and $TiO_2$ concentration. The numerals in Tables are indicated as a percentage by weight. Tables 1 and 2 also show the optical properties of the respective samples.

All of the samples of Examples 1 through 19 are within the scope of the present invention and exhibit excellent optical properties.

It is shown that Examples 2 and 8–18 have low exitation purity because of rich CoO concentration thereof.

Examples 2 to 18 show that exitation purity is reduced by NiO. Each glass of Examples 4 to 18 is given excellent optical properties by a proper amount of NiO though Se is not included.

Example 19 includes CuO in order to reduce the total solar ultraviolet transmittance, and can exhibit high infrared absorptivity without losing the visible light transmittance and the ultraviolet absorptivity.

Each glass of the examples is suitable for a rear window of a vehicle, a window of a building, and the like which prevents degradation of interior materials and is useful for traffic safety.

Examples 20 through 23

Glass samples are prepared in a same manner as in the examples 1 to 19 except that only NiO is added in the example 20, and both of NiO and zinc sulfate are added in the examples 21 to 23 to the glass batch of the Examples 1 to 19. Each number of NiS particles formed in the sample glass is shown in Table 3.

Table 3 shows that the number of NiS is extremely smaller in the examples 21 to 23 where ZnO is comprised than in the example 20.

Comparative Examples 1–4

Table 4 shows glass components and optical properties of Comparative Examples.

All of Comparative Examples 1–4 have components out of the scope of the present invention. Comparative Example 1 has the same components as the example of the JPA 8-157232 as referred above and Comparative Example 2 has the same components as the example of U.S. Pat. No. 5,393,593 as referred above. Comparative Example 3 contains $TiO_2$ as a colorant wherein an amount is out of the scope of the present invention. Comparative Example 4 contains T-$Fe_2O_3$, CoO and $TiO_2$. each amount of which is out of the scope of the present invention. It should be noted that the optical properties of Comparative Example 1 are indicated in values based on a glass thickness of 5 mm and the optical properties of Comparative Example 2 are indicated in values based on a glass thickness of 3.9 mm.

It is apparent from Table 4 that the Comparative Example 1 has smaller values of visible light transmittance and total solar energy transmittance than the Examples of the present invention, Comparative Example 2 has visible light transmittance and total solar energy transmittance, as high as the Examples of the present invention, but it has lower ultraviolet transmittance. Comparative Example 3 has too high values in exciting purity and ultraviolet transmittance. Comparative Example 4 has a too high exciting purity value.

As detailed above, the glass of the present invention exhibits middle visible light transmittance, low total solar energy transmittance, and low ultraviolet transmittance and which has an almost neutral greenish color.

The ultraviolet/infrared absorbent low transmittance glass prevents degradation and discoloration of interior materials and protects privacy when the glass is used for a rear window glass of a vehicle, a window of a building, or the like.

TABLE 1

| (wt %) | | 1 | 2 | 3 | 4 | 5 | 6 | 7 | 8 | 9 | 10 |
|---|---|---|---|---|---|---|---|---|---|---|---|
| T—$Fe_2O_3$ | | 0.8 | 0.9 | 0.8 | 0.8 | 0.9 | 0.95 | 0.9 | 0.8 | 0.8 | 0.8 |
| FeO/T—$Fe_2O_3$ | | 23.8 | 18.9 | 25.0 | 23.1 | 22.2 | 30.0 | 22.1 | 27.5 | 27.0 | 27.9 |
| NiO | | 0.01 | 0.03 | 0.035 | 0.04 | 0.06 | 0.04 | 0.04 | 0.035 | 0.03 | 0.035 |
| Se | | 0.0008 | 0.0005 | 0.0003 | — | — | — | — | — | — | — |
| CoO | | 0.018 | 0.019 | 0.013 | 0.016 | 0.017 | 0.0185 | 0.013 | 0.019 | 0.019 | 0.021 |
| $TiO_2$ | | 2.1 | 1.5 | 1.1 | 1.2 | 1.7 | 1.1 | 1.1 | 1.7 | 2.3 | 1.8 |
| $CeO_2$ | | — | 0.5 | — | — | — | — | 1.0 | — | — | — |
| YA | (%) | 25.4 | 30.4 | 37.4 | 34.7 | 29.0 | 29.1 | 36.6 | 31.3 | 30.6 | 28.9 |
| TG | (%) | 25.5 | 29.3 | 32.2 | 31.2 | 27.5 | 26.7 | 30.6 | 29.0 | 26.5 | 27.9 |
| DW | (nm) | 525 | 550 | 529 | 491 | 547 | 489 | 543 | 492 | 511 | 490 |
| Pe | (%) | 9.8 | 5.0 | 1.7 | 4.6 | 6.8 | 9.5 | 3.6 | 8.3 | 4.3 | 8.6 |
| Tuv | (%) | 5.0 | 5.0 | 6.3 | 6.3 | 6.9 | 7.8 | 3.1 | 7.8 | 4.2 | 7.5 |

TABLE 2

| (wt %) | | 11 | 12 | 13 | 14 | 15 | 16 | 17 | 18 | 19 |
|---|---|---|---|---|---|---|---|---|---|---|
| T—$Fe_2O_3$ | | 0.8 | 0.8 | 0.85 | 0.9 | 0.9 | 0.7 | 0.8 | 0.8 | 0.8 |
| FeO/T—$Fe_2O_3$ | | 23.8 | 23.8 | 25.9 | 33.3 | 22.5 | 21.4 | 21.0 | 23.8 | 23.5 |
| NiO | | 0.04 | 0.045 | 0.04 | 0.04 | 0.06 | 0.04 | 0.04 | 0.04 | 0.04 |
| Se | | — | — | — | — | — | — | — | — | — |
| CoO | | 0.019 | 0.019 | 0.019 | 0.019 | 0.019 | 0.019 | 0.024 | 0.019 | 0.017 |
| $TiO_2$ | | 1.7 | 1.7 | 2.1 | 1.5 | 1.6 | 1.1 | 1.1 | 1.1 | 1.2 |
| $CeO_2$ | | — | — | — | — | 2.0 | 1.0 | 1.5 | CuO:0.2 | |
| YA | (%) | 30.9 | 30.1 | 27 | 25.7 | 27.1 | 31.6 | 25.7 | 30.0 | 29.7 |
| TG | (%) | 29.6 | 29.3 | 25.3 | 19.8 | 26.9 | 34.0 | 30.0 | 29.0 | 27.6 |
| DW | (nm) | 495 | 496 | 495 | 492 | 519 | 493 | 484 | 492 | 493 |
| Pe | (%) | 6.8 | 6.1 | 5.9 | 9.4 | 3.8 | 6.6 | 8.8 | 7.5 | 7.7 |
| Tuv | (%) | 7.8 | 8.3 | 5.1 | 5.2 | 7.4 | 2.2 | 4.0 | 2.5 | 7.3 |

TABLE 3

| | Example No. | | | |
|---|---|---|---|---|
| | 20 | 21 | 22 | 23 |
| Nio concentration (%) | 0.04 | 0.04 | 0.06 | 0.06 |
| ZnO concentration (%) | — | 0.01 | 0.15 | 0.3 |
| numbers of particles of NiS (numbers/g) | 0.6 | 0.4 | 0.3 | 0.1 |

TABLE 4

| | Comparative Example No. | | | |
|---|---|---|---|---|
| (wt %) | 1 | 2 | 3 | 4 |
| T—$Fe_2O_3$ | 0.82 | 1.06 | 0.8 | 1.3 |
| FeO/T—$Fe_2O_3$ | 12.2 | 35.2 | 23.0 | 28.0 |
| NiO | — | — | 0.02 | 0.011 |
| Se | 0.0105 | 0.00103 | — | — |
| CoO | 0.0283 | 0.0123 | 0.019 | 0.012 |
| $TiO_2$ | 0.80 | — | 1.00 | 0.03 |
| thickness (mm) | 5.0 | 3.9 | 4.0 | 4.0 |
| YA (%) | 23.5 | 32.6 | 35.3 | 36.8 |
| TG (%) | 9.0 | 21.0 | 32.9 | 22.5 |
| DW (nm) | 576 | 488 | 485 | 487 |
| Pe (%) | 2.8 | 7.4 | 14.7 | 15.5 |
| Tuv (%) | 3.2 | 17.4 | 11.0 | 7.1 |

What is claimed is:

1. An ultraviolet/infrared absorbent low transmittance glass having a neutral greenish color and consisting of a base glass comprising:

65 to 80 wt. % $SiO_2$:

0 to 5 wt. % $Al_2O_3$;

0 to 10 wt. % MgO;

5 to 15 wt. % CaO wherein a total amount of MgO and CaO is between 5 and 15 wt. %;

10 to 18 wt. % $Na_2O$;

0 to 5 wt. % $K_2O$ wherein a total amount of $Na_2O$ and $K_2O$ is between 10 and 20 wt. %; and 0 to 5 wt. % $B_2O_3$; and colorants comprising:

0.7 to 0.95 wt. % total iron oxide (T-$Fe_2O_3$) expressed as $Fe_2O_3$;

1.1 to 2.3 wt. % $TiO_2$;

0 to 2.0 wt. % $CeO_2$;

0.013 to 0.025 wt. % CoO;

0 to 0.0008 wt. % Se; and 0.01 to 0.07 wt. % NiO, wherein said glass with a thickness between 3.1 and 5 mm has a visible light transmittance (YA) by the C.I.E. illuminant A in a range from 25% to 45% and a total solar energy transmittance (TG) in a range from 10% to 40%.

2. An ultraviolet/infrared absorbent low transmittance glass as claimed in claim 1, wherein CoO is between 0.019 wt. % and 0.025 wt. %.

3. An ultraviolet/infrared absorbent low transmittance glass as claimed in claim 1, wherein NiO is between 0.03 wt. % to 0.06 wt. %.

4. An ultraviolet/infrared absorbent low transmittance glass as claimed in claim 1, wherein said glass has an ultraviolet transmittance of no greater than 10% at a thickness between 3.1 and 5 mm.

5. An ultraviolet/infrared absorbent low transmittance glass as claimed in claim 1, wherein the glass with a thickness between 3.1 and 5 mm has a dominant wavelength of 480 to 560 nanometers with the C.I.E. standard illuminant C and an excitation purity of less than 10% with the C.I.E. standard illuminant C.

6. An ultraviolet/infrared absorbent low transmittance glass as claimed in claim 1, further comprising ZnO in an amount between 0 and 0.5 wt. %.

7. An ultraviolet/infrared absorbent low transmittance glass as claimed in claim 1, further comprising ZnO in an amount between 0.01 wt. % and 0.3 wt. %.

* * * * *